(12) United States Patent
Mason et al.

(10) Patent No.: US 11,086,821 B2
(45) Date of Patent: Aug. 10, 2021

(54) IDENTIFYING FILE EXCLUSIONS FOR WRITE FILTER OVERLAYS

(71) Applicant: Dell Products L.P., Round Rock, TX (US)

(72) Inventors: Ryan G. Mason, San Jose, CA (US); Sumit K. Popli, Campbell, CA (US); Suruchi Dubey, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 16/438,236

(22) Filed: Jun. 11, 2019

(65) Prior Publication Data

US 2020/0394158 A1    Dec. 17, 2020

(51) Int. Cl.
*G06F 16/00* (2019.01)
*G06F 16/17* (2019.01)
*G06F 16/11* (2019.01)
*G06F 16/13* (2019.01)

(52) U.S. Cl.
CPC ........ *G06F 16/1734* (2019.01); *G06F 16/122* (2019.01); *G06F 16/13* (2019.01); *G06F 16/1727* (2019.01)

(58) Field of Classification Search
CPC .. G06F 16/211; G06F 16/2477; G06F 16/283; G06F 16/2255; G06F 16/2237; G06F 16/9014; G06F 16/2264; G06F 16/2272; G06F 16/2282; G06F 16/24578; G06F 16/9566; G06F 16/20; G06F 16/22; G06F 15/16; G06F 16/00; G06F 17/00; G06F 17/30
See application file for complete search history.

(56) References Cited

U.S. PATENT DOCUMENTS

| | | | | |
|---|---|---|---|---|
| 9,665,283 B2 * | 5/2017 | Mylvara | ............... | G06F 3/0632 |
| 10,353,636 B2 * | 7/2019 | Kaushik | ............... | G06F 3/0659 |
| 10,402,231 B2 * | 9/2019 | Marriner | ............... | G06F 9/5077 |
| 10,769,130 B1 * | 9/2020 | Armbrust | ............ | G06F 16/2358 |
| 10,824,957 B2 * | 11/2020 | Yamaguchi | ......... | H04L 12/6418 |
| 10,880,366 B1 * | 12/2020 | Chen | ....................... | G06F 16/25 |

(Continued)

OTHER PUBLICATIONS

Efficient Tracking, Monitoring, and Orchestration of Cloud Resources, Du et al (Year: 2017).*

*Primary Examiner* — Jean M Corrielus
(74) *Attorney, Agent, or Firm* — Baker Botts L.L.P.

(57) ABSTRACT

A system and method for identifying write filter exclusions for information handling systems in a computing environment. Each information handling system includes a file exclusion driver and a file exclusion service. The file exclusion driver can monitor files to be stored in a write filter overlay and identify recurring files previously stored in the write filter overlay. The file exclusion driver can determine if a cumulative file size of a recurring file exceeds an adjustable threshold, and add data describing the recurring file to an exclusion list if the cumulative file size exceeds the adjustable threshold. The file exclusion service can transmit the exclusion list to the device management server for analysis, receive a master exclusion list from the device management server based on analysis, and can store a set of excluded files in a local storage resource based on the master exclusion list.

18 Claims, 5 Drawing Sheets

(56) References Cited

U.S. PATENT DOCUMENTS

| | | | | |
|---|---|---|---|---|
| 2001/0044901 | A1* | 11/2001 | Grawrock | G06F 21/602 |
| | | | | 713/189 |
| 2007/0186070 | A1* | 8/2007 | Federa | G06F 12/1425 |
| | | | | 711/163 |
| 2007/0208893 | A1* | 9/2007 | Azzarello | G06F 16/1744 |
| | | | | 710/68 |
| 2012/0311263 | A1* | 12/2012 | Kamath | G06F 3/0622 |
| | | | | 711/118 |
| 2013/0145105 | A1* | 6/2013 | Sawicki | G06F 16/176 |
| | | | | 711/147 |
| 2013/0198742 | A1* | 8/2013 | Kumar | G06F 9/45558 |
| | | | | 718/1 |
| 2016/0342519 | A1* | 11/2016 | Liashenko | G06F 16/2237 |
| 2016/0342621 | A1* | 11/2016 | Mylvara | G06F 16/192 |
| 2017/0075921 | A1* | 3/2017 | Benton | H04L 67/1095 |
| 2018/0089221 | A1* | 3/2018 | Borkar | G06F 16/176 |
| 2018/0129569 | A1* | 5/2018 | Jathar | G06F 11/1451 |
| 2018/0225105 | A1* | 8/2018 | Kaushik | G06F 8/65 |
| 2020/0050685 | A1* | 2/2020 | Vajravel | G06F 16/172 |

* cited by examiner

500

```
┌─────────────────────────────────────────────────────────────────┐
│  RECEIVE EXCLUSION LISTS DESCRIBING EXCLUDED FILES FROM EACH    │
│     INFORMATION HANDLING SYSTEM IN COMPUTING ENVIRONMENT.       │
│                              510                                │
└─────────────────────────────────────────────────────────────────┘
                                │
                                ▼
┌─────────────────────────────────────────────────────────────────┐
│   SELECT SET OF EXCLUDED FILES TO BE STORED IN LOCAL STORAGE    │
│           RESOURCE OF INFORMATION HANDLING SYSTEM.              │
│                              520                                │
└─────────────────────────────────────────────────────────────────┘
                                │
                                ▼
┌─────────────────────────────────────────────────────────────────┐
│      GENERATE MASTER EXCLUSION LIST INCLUDING SET OF EXCLUDED FILES. │
│                              530                                │
└─────────────────────────────────────────────────────────────────┘
                                │
                                ▼
┌─────────────────────────────────────────────────────────────────┐
│  TRANSMIT MASTER EXCLUSION LIST TO EACH INFORMATION HANDLING    │
│             SYSTEM IN COMPUTING ENVIRONMENT.                    │
│                              540                                │
└─────────────────────────────────────────────────────────────────┘
```

FIG. 5

IDENTIFYING FILE EXCLUSIONS FOR WRITE FILTER OVERLAYS

BACKGROUND

Field of the Disclosure

The disclosure relates generally to information handling systems, and specifically, to identifying file exclusions for write filter overlays of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a write filter for volatile storage of certain files in order to protect physical storage media from data writes. For example, a thin client device may execute applications such that application files, or other associated I/O, generated by the applications are redirected from a local storage device (e.g., hard drive) and stored instead in a virtual overlay, or "write filter overlay," by default. Write filter overlays are typically volatile storage, and redirected application files are erased upon reboot of the information handling system. Redirecting application files in this manner affords the benefits of providing users with a clean experience for thin clients and workspaces that experience frequent guests (e.g., school computer, library computer, and the like), increasing security on devices that do not require the frequent installation of new applications, and reducing wear on solid-state devices of the information handling system. However, address space within a write filter overlay is typically finite, and can quickly become full when executing certain applications that may require saving several files to memory. For example, files such as application log files, browser files (i.e., cache, history, cookies, downloads, and the like), and application cache files may quickly consume address space in a write filter overlay while executing. As address space of the write filter overlay is consumed, the information handling system can become unstable and may require reboot to erase contents of the write filter overlay. This is undesirable for users of the information handling system as the system may require frequent reboots, and/or if the system reboots automatically which may result in lost work. In addition, it may be beneficial for users to retain access to files such as log files and application cache files across reboots.

SUMMARY

In one aspect, a disclosed system for identifying write filter exclusions in a computing environment includes a network, a device management server, and a plurality of information handling systems. Each information handling system includes a write filter overlay configured to store a plurality of files, a local storage resource configured to store a set of excluded files, a file exclusion driver, and a file exclusion service. The file exclusion driver is configured to monitor one or more recurring files of the plurality of files, where each of the one or more recurring files was previously stored in the write filter overlay, and each of the one or more recurring files is associated with a cumulative file size; determine if the cumulative file size associated with each of the one or more recurring files exceeds an adjustable threshold; and in response to determining that a cumulative file size associated with a recurring file exceeds the adjustable threshold, add data describing the recurring file to an exclusion list. The file exclusion service is configured to transmit the exclusion list to the device management server for analysis; receive a master exclusion list from the device management server based on the analysis, where the master list includes the set of excluded files to be stored in the local storage resource of the information handling system; and store the set of excluded files into the local storage resource of the information handling system.

In one or more of the disclosed embodiments, the device management server is configured to receive a plurality of exclusion lists, where each exclusion list includes data describing one or more excluded files, and where each exclusion list is transmitted by an information handling system in the computing environment; select the set of excluded files from the plurality of exclusion lists; generate the master exclusion list; and transmit the master exclusion list to each information handling system in the computing environment.

In one or more of the disclosed embodiments, the set of excluded files comprises at least one of: one or more excluded files included in a threshold percentage of the plurality of exclusion lists; one or more excluded files having a highest frequency of being previously stored in the write filter overlay of each information handling system; and one or more excluded files having a highest cumulative file size.

In one or more of the disclosed embodiments, the file exclusion driver is further configured to identify one or more large files of the plurality of files, where each of the one or more large files is associated with a file size that exceeds the adjustable threshold; and add data describing the one or more large files to the exclusion list.

In one or more of the disclosed embodiments, the file exclusion driver is further configured to identify one or more folders storing the one or more recurring files on the information handling system; and add data describing the one or more folders to the exclusion list.

In one or more of the disclosed embodiments, the file exclusion service is further configured to redirect the set of excluded files from being stored in the write filter overlay of the information handling system via an application programming interface.

In one or more of the disclosed embodiments, the cumulative file size is comprised of a file size for each instance in which the recurring file was previously stored in the write filter overlay.

In one or more of the disclosed embodiments, the one or more recurring files include at least one of: a plurality of log files; a plurality of browser cache files; and a plurality of application cache files.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

For a more complete understanding of the present invention and its features and advantages, reference is now made to the following description, taken in conjunction with the accompanying drawings, in which:

FIG. 5 is a flowchart depicting selected elements of an embodiment of a method for identifying write filter exclusions for a plurality of information handling systems in a computing environment.

DESCRIPTION OF PARTICULAR EMBODIMENT(S)

Figure 1:
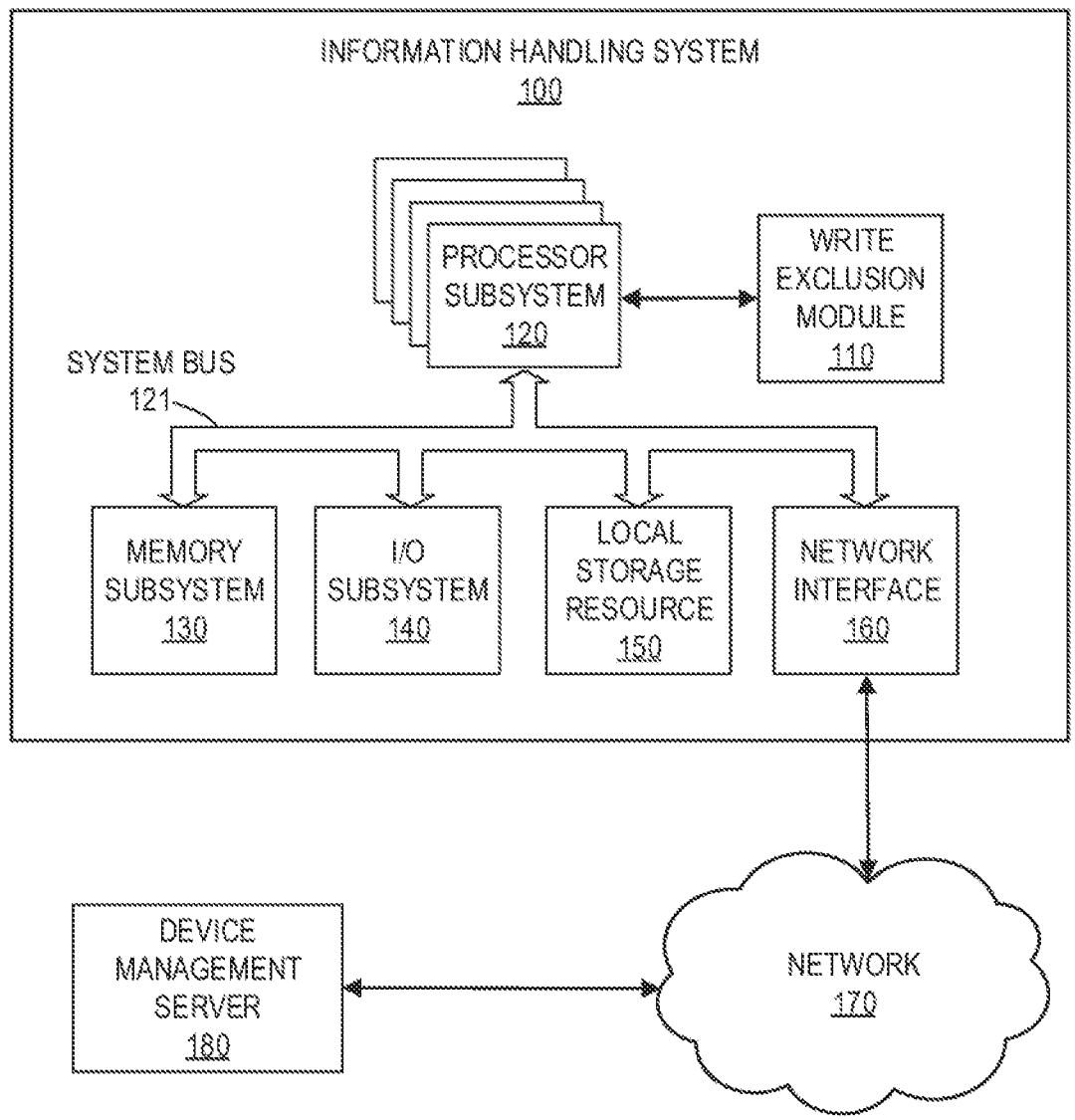
FIG. 1 is a block diagram of selected elements of an embodiment of a computing environment that includes an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more power supplies, one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As will be described in further detail, the inventors of the present disclosure have developed a system and method for identifying write filter exclusions for information handling systems in a computing environment. Each information handling system includes a file exclusion driver and a file exclusion service. The file exclusion driver can monitor files to be stored in a write filter overlay and identify recurring files previously stored in the write filter overlay. The file exclusion driver can determine if a cumulative file size of a recurring file exceeds an adjustable threshold, and add data describing the recurring file to an exclusion list if the cumulative file size exceeds the adjustable threshold. The file exclusion service can transmit the exclusion list to the device management server for analysis, receive a master exclusion list from the device management server based on analysis, and can store a set of excluded files in a local storage resource based on the master exclusion list.

Particular embodiments are best understood by reference to FIGS. 1-5, in which like numbers are used to indicate like and corresponding parts.

FIG. 1 is a block diagram of selected elements of an embodiment of a computing environment 190 that includes an information handling system 100. In the embodiment illustrated in FIG. 1, computing environment 190 includes a network 170, a device management server 180, and information handling system 100. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. It is noted that additional information handling systems 100 coupled to device management server 180 are not shown in FIG. 1 so as to not obscure the details of information handling system 100.

As shown in FIG. 1, components of information handling system 100 may include, but are not limited to, a write exclusion module 110 coupled to a processor subsystem 120 (which may comprise one or more processors), and system bus 121 that communicatively couples various system components to processor subsystem 120 including, for example, a memory subsystem 130, an I/O subsystem 140, a local storage resource 150, and a network interface 160.

System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely.

In one embodiment, write exclusion module 110 may comprise a system, device, or apparatus operable to identify files to be excluded from a write filter overlay of information handling system 100. In particular, write exclusion module 110 may monitor all files being written to a write filter overlay in information handling system 100 and determine which of the monitored files to be redirected into a memory of information handling system 100 (e.g., memory subsystem 130 or local storage resource 150) based on an adjustable threshold file size. Write exclusion module 110 can identify which of the monitored files have been previously stored in the write filter overlay, or "recurring files," and can determine if a cumulative file size for a recurring file—comprised of each instance the recurring file was previously stored in the write filter overlay—exceeds the adjustable threshold. In addition, write exclusion module 110 can determine which of the monitored files have a file size exceeding the adjustable threshold, or "large files," regardless of whether the file is recurring.

Write exclusion module 110 generates a list of files, or an "exclusion list," that includes data describing each of the files (e.g., recurring files and/or large files) determined to exceed the adjustable threshold, or "excluded files." In one embodiment, write exclusion module 110 transmits the exclusion list to device management server 180 for analysis. In response, write exclusion module 110 receives a list from device management server 180, or "master exclusion list," based on the analysis performed by device management server 180. The master exclusion list is comprised of a set of excluded files from exclusion lists generated by each information handling system 100 in computing environment 190 (not shown in FIG. 1). In one embodiment, write exclusion module 110 uses the master exclusion list to redirect each of the excluded files from being stored in the write filter overlay of information handling system 100. In another embodiment, write exclusion module 110 uses the exclusion list (rather than the master exclusion list) to redirect each of the excluded files, independent of device management server 180.

In one embodiment, write exclusion module 110 is comprised of a file exclusion driver and a file exclusion service that work in tandem to identify excluded files for information handling system 100. Write exclusion module 110 can use the file exclusion driver to monitor all files being stored to a write filter overlay in information handling system 100 and generate an exclusion list of excluded files. Write exclusion module 110 can use the file exclusion service to send the generated exclusion list to device management server 180 and to redirect excluded files to local storage resource 150. The file exclusion driver and file exclusion service will be described in greater detail with respect to FIG. 2.

In the embodiment illustrated in FIG. 1, device management server 180 may comprise a system, device, or apparatus operable to analyze exclusion lists received from a plurality of information handling systems 100 in computing environment 190, generate a master exclusion list based on the analysis, and send the master exclusion list to each information handling system 100 in computing environment 190. As illustrated in FIG. 1, device management server 180 is communicatively coupled to information handling system 100 over network 170, which device management server 180 can use to, both, receive exclusion lists from information handling system 100 and transmit master exclusion lists to information handling system 100. Device management server 180 will be described in greater detail with respect to FIG. 3.

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 170. Network interface 160 may enable information handling system 100 to communicate over network 170 using a suitable transmission protocol and/or standard, including, but not limited to, transmission protocols and/or standards enumerated below with respect to the discussion of network 170. In some embodiments, network interface 160 may be communicatively coupled via network 170 to device management server 180. Network 170 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 170 may include one or more routers for routing data between client information handling systems 100 and server information handling systems 100. A device (e.g., a client information handling system 100 or a server information handling system 100) on network 170 may be addressed by a corresponding network address including, for example, an Internet protocol (IP) address, an Internet name, a Windows Internet name service (WINS) name, a domain name or other system name. In particular embodiments, network 170 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 170 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 170 and its various components may be implemented using hardware, software, or any combination thereof.

Figure 2:
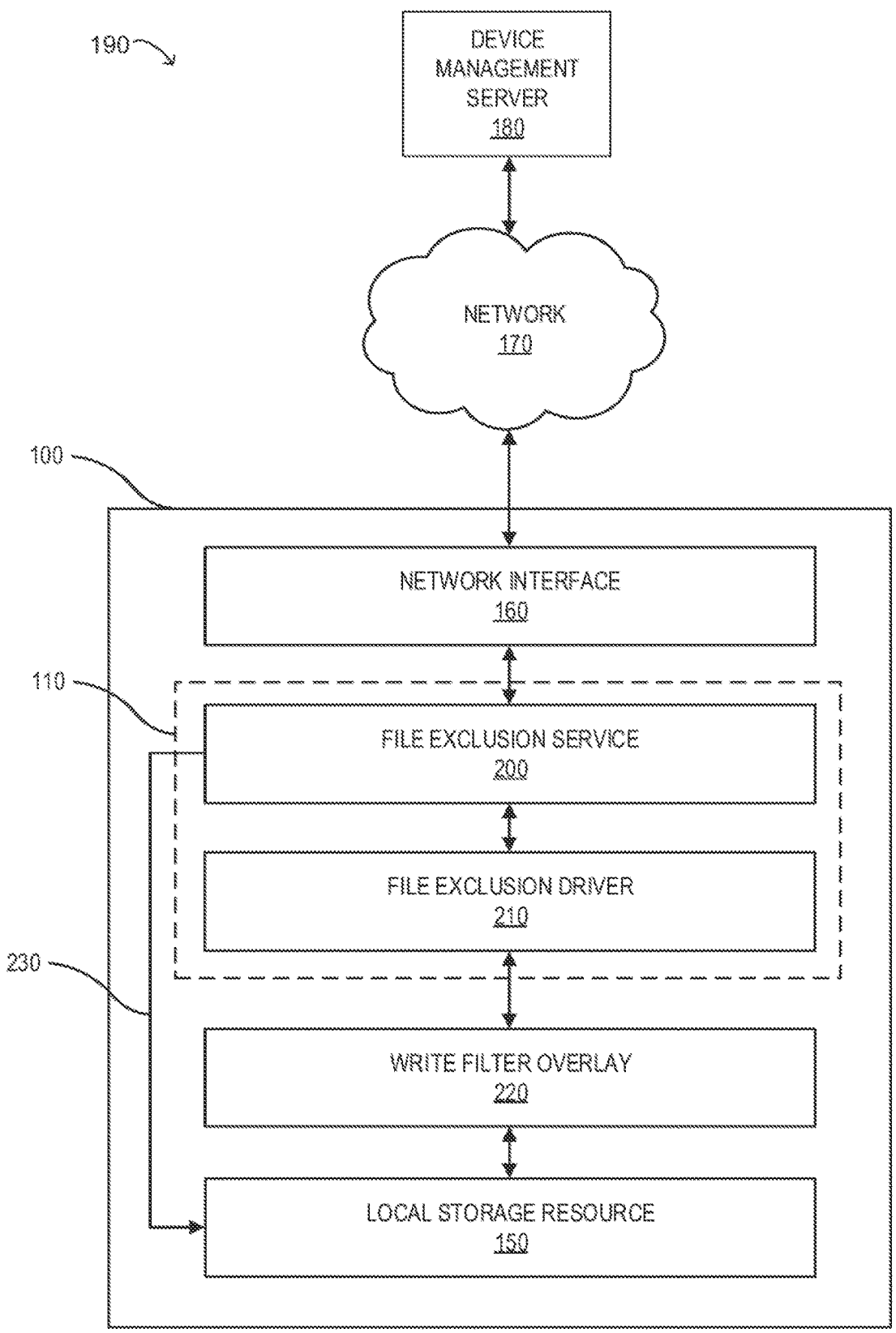
FIG. 2 is a block diagram of selected elements of an embodiment of an information handling system.

FIG. 2 is a block diagram of selected elements of an embodiment of information handling system 100. In the embodiment illustrated in FIG. 2, information handling system 100 includes write filter module 110, write filter overlay 220, and local storage resource 150. Write filter module includes file exclusion driver 210 and file exclusion service 200 that communicates with device management server 180 over network 170. It is noted that additional information handling systems 100 coupled to device management server 180 are not shown in FIG. 2 so as to not obscure the details of information handling system 100.

In the embodiment illustrated in FIG. 2, write filter overlay 220 may be a suitable system, apparatus, or device operable to store files generated by information handling system 100. Write filter overlay 220 stores files generated by information handling system 100 at runtime, which are removed when information handling system 100 is rebooted thereby restoring information handling system 100 to its original state. As such, information handling system 110 can use write filter overlay 220 to provide a clean experience for guests, increase security of computing environment 190, and reduce wear on solid-state devices within the information handling system 100. Write filter overlay 220 may have a finite address space (e.g., 1 or 2 GB) used to store files, and information handling system 100 may be automatically rebooted if the address space becomes full. To reduce this risk, write filter overlay 220 is associated with an adjustable threshold file size (e.g., 10 MB) which the write filter module 110 can use to identify, and redirect, files that exceed the adjustable threshold, thus preventing the finite address space of the write filter overlay 220 from becoming full.

The adjustable threshold for file sizes may be based on random access memory (RAM) size of information handling system 100, and may be consistent across similar information handling systems 100 (e.g., similar makes, models, applications, etc.) within computing environment 190. Adjustable threshold may be updated to permit larger or smaller file sizes to be stored in write filter overlay 220. For example, adjustable threshold may be set to permit adequate storage for applications running on information handling system 100 (e.g., less than 10 GB), while prohibiting storage of large files (e.g., greater than 10 GB) to ensure sufficient RAM for running applications. In one embodiment, adjustable threshold may be determined by device management server 180. In another embodiment, adjustable threshold may be determined by an administrator of device management server 180.

In the embodiment illustrated in FIG. 2, file exclusion driver 210 may comprise a system, device, or apparatus operable to monitor all files being written to write filter overlay 220 in information handling system 100, identify files having file sizes, or cumulative file sizes, that exceed an adjustable threshold, and generate an exclusion list that includes data describing each of the files that exceed the adjustable threshold. When monitoring all files being written to write filter overlay 220, file exclusion driver 210 may track unique, non-overlapping, files that are not currently stored in local storage resource 150. Each unique file is associated with a file size. File exclusion driver 210 may track unique files using exact file names associated with each file and monitor how much data is being written (e.g., in bytes) to write filter overlay 220 over time based on file size. If file exclusion driver 210 determines that an application is attempting to store a file (e.g., recurring file and/or large file) having a file size, or cumulative file size, greater than the adjustable threshold of write filter overlay 220, file exclusion driver 210 may add data describing the file to an exclusion list. In one embodiment, the data describing the file may include the filename, a number of instances in which the file has previously been written to write filter overlay 220, and a number of bytes that are written in each instance. In another embodiment, the data describing the file may include filename and file size (e.g., in bytes) or cumulative file size (e.g., how many total bytes have been written to write filter overlay 220 over time). Other embodiments may include additional, fewer, or any combination of the data described above.

In one embodiment, file exclusion driver 210 may track several unique files being written to a folder (e.g., a browser cache folder) of information handling system 100 while an application is running. If file exclusion driver 210 determines that the collective file sizes of the unique files being written to the folder cause a total file size of the folder to exceed the adjustable threshold of write filter overlay 220, file exclusion driver 210 may add data describing the folder to an exclusion list. In one embodiment, data describing the folder may include a folder name, a number of total bytes consumed by the folder, filenames of the files within the folder, a number of instances in which each of the files within the folder has previously been written to write filter overlay 220, and a number of bytes that are written in each instance. In another embodiment, the data describing the folder may include a folder name, a number of files within the folder, and a total file size of the folder (e.g., comprised of the collective file sizes of the unique files within the folder). Other embodiments may include additional, fewer, or any combination of the data described above.

In one embodiment, file exclusion driver 210 can send the exclusion list to file exclusion service 200 such that file exclusion service 200 may redirect each excluded file from being stored in write filter overlay 220. In this way, file exclusion driver 210 can identify files to be redirected to local storage resource 150 to reduce the risk of write filter overlay 220 becoming full and causing information handling system 100 to reboot.

In the embodiment illustrated in FIG. 2, file exclusion service 200 may comprise a system, device, or apparatus operable to serve as an interface between file exclusion driver 210 and device management server 180. In particular, file exclusion service 200 can receive exclusion lists from file exclusion driver 210 and can transmit the received exclusion lists to device management server 180 (e.g., via network interface 160 or directly over network 170) for analysis. Once analysis is complete, file exclusion service 200 receives a master exclusion list from device management server 180. In one embodiment, master exclusion list includes a set of excluded files from exclusion lists generated by each information handling system 100 in computing environment 190. In another embodiment, master exclusion list includes all excluded files from each exclusion list generated by each information handling system 100 in computing environment 190. File exclusion service 200 can then redirect excluded files to local storage resource 150 based on the master exclusion list. In the embodiment illustrated in FIG. 2, excluded files are redirected via application programming interface (API) 230.

In one embodiment, file exclusion service 200 may redirect excluded files via API 230 based on the exclusion list received from file exclusion driver 210. That is, rather than transmitting the exclusion list to device management server 180 for analysis and receiving a master exclusion list that includes excluded files across similar information handling systems 100 in computing environment 190, file exclusion service 200 may simply redirect excluded files based on the exclusion list. In this way, file exclusion service 200 may redirect only those files generated by information handling system 100.

Figure 3:
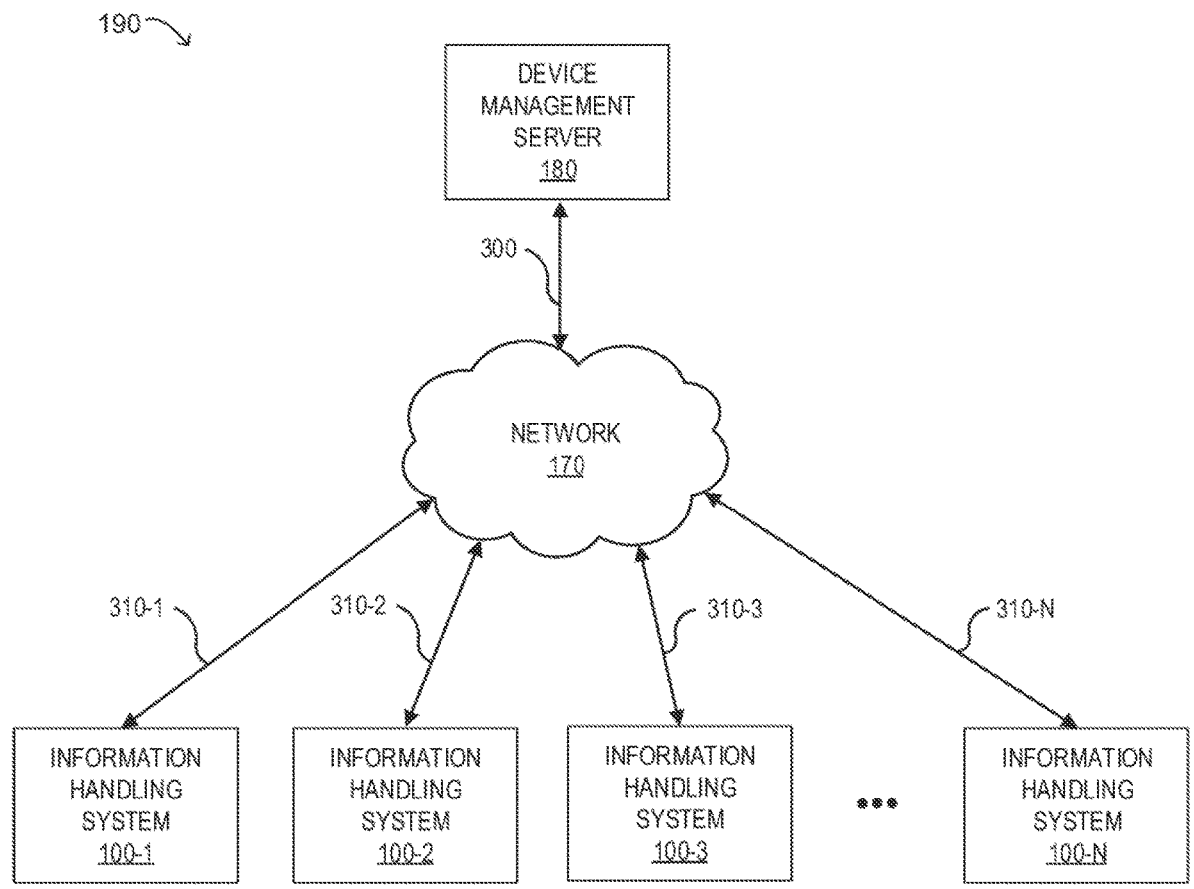
FIG. 3 is a block diagram of selected elements of an embodiment of a computing environment that includes a plurality of information handling systems.

FIG. 3 is a block diagram of selected elements of an embodiment of computing environment 190 that includes a plurality of information handling systems 100-1 through 100-N (collectively referred to herein as "information handling systems 100") similar to information handling system 100 described above. Each respective file exclusion driver 210 of information handling systems 100 generates an exclusion list 310-1 through 310-N (collectively referred to herein as "exclusion lists 310") describing files determined to exceed the adjustable threshold of write filter overlay 220 as described above. Each information handling system 100 transmits its exclusion list 310 via network 170 to device management server 180 for analysis. In one embodiment, exclusion lists 310 are transmitted from information handling systems 100 to device management server 180 asynchronously such that each exclusion list 310 is transmitted as each file exclusion driver 210 identifies files exceeding the adjustable threshold. In another embodiment, exclusion lists 310 are asynchronously transmitted from information handling systems 100 to device management server 180 based on a configured time interval (e.g., daily, weekly, monthly, and the like). For example, information handling systems 100 may be scheduled to release exclusion lists 310 on a daily basis. In yet another embodiment, exclusion lists 310 are transmitted synchronously from information handling systems 100 to device management server 180, such as in response to an application installation or operating system update, for example.

Device management server 180 receives each of the exclusion lists 310 transmitted from information handling systems 100 and analyzes the excluded files, or folders, described by each exclusion list 310. In one embodiment, device management server 180 analyzes the excluded files by identifying common excluded files shared across exclusion lists 310 to determine which excluded files are most commonly stored in write filter overlay 220 of information handling systems 100. For example, if an application that requires frequent storage of log files is installed on each information handling system 100 in computing environment 190, each information handling system 100 will generate an exclusion list that includes the log files once the adjustable threshold of write filter overlay 220 has been exceeded. In another embodiment, device management server 180 analyzes excluded files by identifying a frequency in which each excluded file has been previously stored in write filter overlay 220 to determine which excluded files require storage in write filter overlay 220 of information handling systems 100 most frequently. For example, if information handling systems 100 in a business environment are typically used for word processing rather than web browsing, device management server 180 may identify a higher frequency of application cache files being stored in write filter overlay 220 than browser cache files. In yet another embodiment, device management server 180 analyzes each excluded file by determining a cumulative file size associated with each excluded file to determine which excluded files consume the most address space of write filter overlay 200 of information handling systems 100. For example, device management server 180 may determine that log files generated by applications running on information handling system 100 yield a larger cumulative file size than browser cache files and application cache files. In one embodiment, device management server 180 may analyze folders containing unique files having a collective file size that exceeds the adjustable threshold of write filter overlay 220 across information handling systems 100. For example, device management server 180 may identify a folder commonly included in exclusion lists that includes log files having a collective file size that exceeds the adjustable threshold. Other embodiments for analyzing excluded files may include additional, fewer, or any combination of the embodiments described above.

While analyzing each exclusion list 310, device management server 180 may identify exclusion lists 310 that include data describing excluded files, or folders, that are not included in any of the other received exclusion lists 310. That is, device management server 180 may identify excluded files, or folders, that are unique to particular information handling systems 100. This might indicate that the unique excluded files, or folders, were generated by applications that have not been installed on the other information handling systems 100 in computing environment 190. For example, if a user of information handling system 100 installed a web browser that requires storage of cache files collectively exceeding the adjustable threshold of write filter overlay 220, the exclusion list generated by information handling system 100 may include data describing the cache files not included in exclusion lists generated by other information handling systems 100 in computing environment 190. However, unique excluded files, or folders, might indicate the presence of malicious software (e.g., malware, ransomware, spyware, and the like) installed on an information handling system that is attempting to store files in write filter overlay 200 that exceed the adjustable threshold. In one embodiment, device management server 180 may notify an administrator in response to identifying unique excluded files, or folders, to identify their origins and/or determine whether they pose a threat to computing environment 190. In another embodiment, device management server 180 may instruct write filter service 200 to exclude all files generated by the application or malicious software from being stored in information handling system 100. Thus, analyzing exclusion lists 310 generated by each information handling system 100 allows device management server 180 to detect irregularities, and potential threats, in computing environment 190.

Once the analysis is complete, device management server 180 selects a set of excluded files, or folders, from the exclusion lists 310 received from information handling systems 100 to generate a master exclusion list 300. In one embodiment, device management server 180 selects a set of excluded files based on which excluded files were determined to be commonly stored in write filter overlay 220 of information handling systems 100. In particular, device management server 180 may select excluded files that are included in more than a threshold percentage of exclusion lists 310 generated by information handling systems 100. For example, if log files generated by an application installed on each information handling system 100 in computing environment 190 are included in 75% of the exclusion lists received, device management server 180 may select the log files to be included in master exclusion list 300. In another embodiment, device management server 180 selects excluded files determined to require storage in write filter overlay 220 most frequently. For example, if device management server 180 identifies a higher frequency of application cache files being stored in write filter overlays 220 of information handling systems 100 than browser cache files, device management server 180 may select the application cache files to be included in master exclusion list 300. In yet another embodiment, device management server 180 selects excluded files determined to consume the most address space of write filter overlay 200 across information handling systems 100. For example, if device management server 180 identifies that log files generated by applications running on information handling systems 100 yield a larger cumulative file size than browser cache files and application files, device management server 180 may select the log files to be included in master exclusion list 300. In one embodiment, device management server 180 may select folders containing unique files having a collective file size that exceeds the adjustable threshold of write filter overlay 220 across information handling systems 100. For example, device management server 180 may select a folder commonly included in exclusion lists that includes log files having a collective file size that exceeds the adjustable threshold. Other embodiments for selecting a set of excluded files, or folders, to include in a master exclusion list may include additional, fewer, or any combination of the embodiments described above. Once generated, device management server 180 transmits master exclusion list 300 to information handling systems 100 where file exclusion service 200 can identify files, or folders, to be redirected from write filter overlay 220 and stored in local storage resource 150. In one embodiment, each master exclusion list is maintained and updated by device management server 180. In another embodiment, each master exclusion list requires approval by an administrator of device management server 180 before sending to information handling systems 100.

Figure 4:
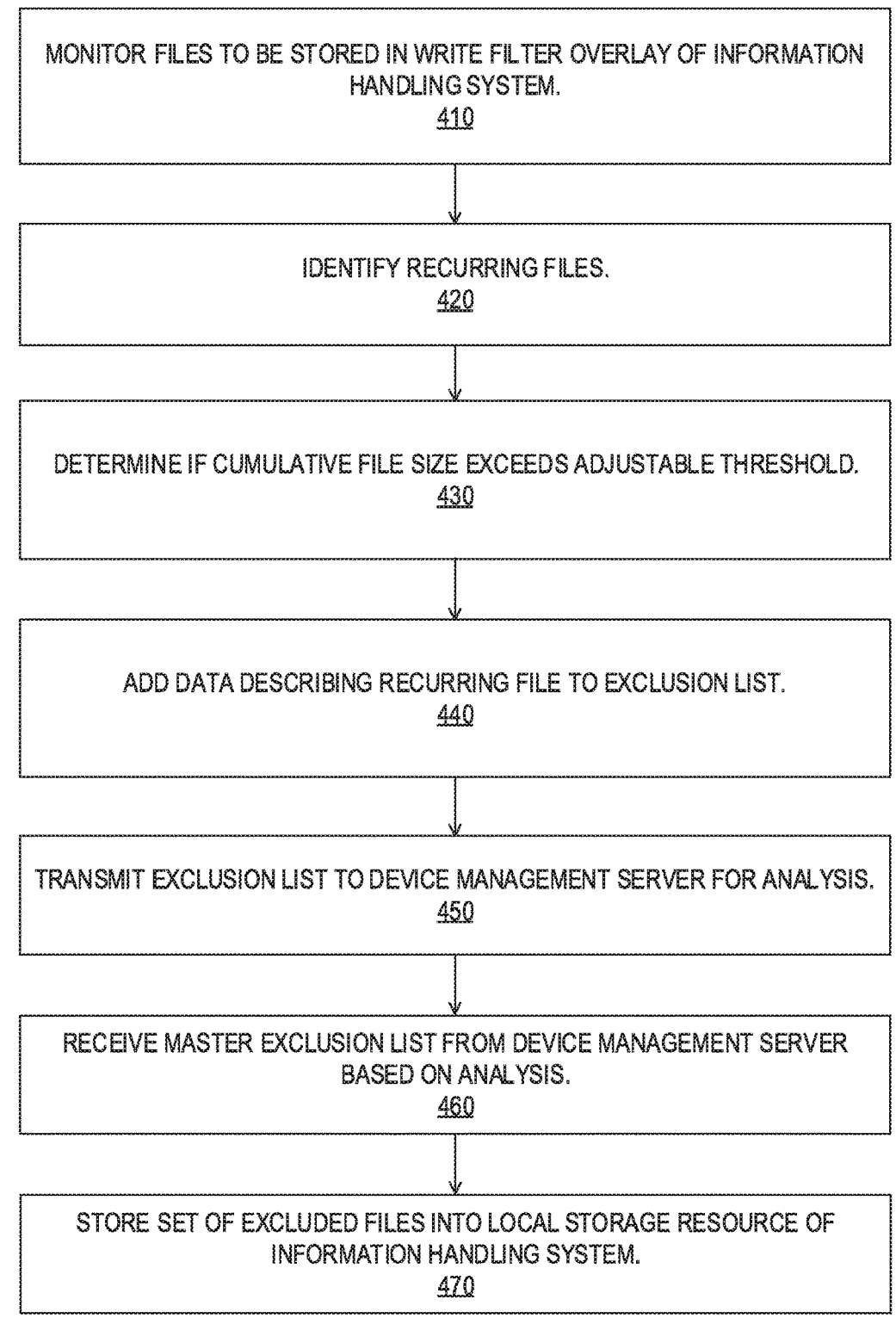
FIG. 4 is a flowchart depicting selected elements of an embodiment of a method for identifying write filter exclusions in a computing environment.

FIG. 4 illustrates a flowchart depicting selected elements of an embodiment of a method 400 for identifying write filter exclusions in a computing environment 190. It is noted that certain operations described in method 400 may be optional or may be rearranged in different embodiments.

The information handling system 100 monitors 410 files to be stored in a write filter overlay 220 of the information handling system 100. The information handling system 100 identifies 420 recurring files that have been previously stored in the write filter overlay 220. Each of the recurring files is associated with a cumulative file size. The information handling system 100 can determine 430 if the cumulative file size associated with each recurring files exceeds an adjustable threshold, and can add 440 data describing a recurring file to an exclusion list in response to determining that the cumulative file size exceeds the adjustable threshold. The information handling system can transmit 450 the exclusion list to a device management server for analysis, and can receive 460 a master exclusion list from the device management server based on the analysis. The master exclusion list includes data describing a set of excluded files to be stored in a local storage resource of the information handling system. The information handling system 100 stores 470 the set of excluded files into the local storage resource of the information handling system.

FIG. 5 illustrates a flowchart depicting selected elements of an embodiment of a method 500 for identifying write filter exclusions for a plurality of information handling systems in a computing environment 190. It is noted that certain operations described in method 500 may be optional or may be rearranged in different embodiments.

The device management server 180 may receive 510 exclusion lists that each include data describing excluded files from each information handling system in computing environment 190. The device management server 180 selects 520 a set of excluded files to be stored in a local storage resource in each information handling system 100 in the computing environment 190. The device management server 180 generates 530 a master exclusion list that includes the set of excluded files, and transmits 540 the master exclusion list to each information handling system in the computing environment 190.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system for identifying write filter exclusions in a computing environment, the system comprising:
    a network;
    a device management server; and
    a plurality of information handling systems, each information handling system including:
        a write filter overlay configured to store a plurality of files;
        a local storage resource configured to store a set of excluded files;
        a file exclusion driver configured to:
            monitor one or more recurring files of the plurality of files, each of the one or more recurring files previously stored in the write filter overlay, and each of the one or more recurring files associated with a cumulative file size;
            determine if the cumulative file size associated with each of the one or more recurring files exceeds an adjustable threshold; and
            in response to determining that a cumulative file size associated with a recurring file of the one or more recurring files exceeds the adjustable threshold, add data describing the recurring file to an exclusion list; and
        a file exclusion service configured to:
            transmit the exclusion list to a device management server for analysis;
            receive a master exclusion list from the device management server based on the analysis, the master exclusion list including data describing a set of excluded files to be stored in the local storage resource of the information handling system;
            redirect the set of excluded files from being stored in the write filter overlay of the information handling system via an application programming interface; and
            store the set of excluded files into the local storage resource of the information handling system.

2. The system of claim 1, wherein the device management server is configured to:
    receive a plurality of exclusion lists, each exclusion list including data describing one or more excluded files, and each exclusion list transmitted by an information handling system in the computing environment;
    select the set of excluded files from the plurality of exclusion lists;
    generate the master exclusion list; and
    transmit the master exclusion list to each information handling system in the computing environment.

3. The system of claim 2, wherein the set of excluded files comprises at least one of:
    one or more excluded files included in a threshold percentage of the plurality of exclusion lists;
    one or more excluded files having a highest frequency of being previously stored in the write filter overlay of each information handling system; and
    one or more excluded files having a highest cumulative file size.

4. The system of claim 1, wherein the file exclusion driver is further configured to:
    identify one or more large files of the plurality of files, each of the one or more large files associated with a file size that exceeds the adjustable threshold; and
    add data describing the one or more large files to the exclusion list.

5. The system of claim 1, wherein the file exclusion driver is further configured to:
    identify one or more folders storing the one or more recurring files on the information handling system; and
    add data describing the one or more folders to the exclusion list.

6. The system of claim 1, wherein the cumulative file size is comprised of a file size for each instance in which the recurring file was previously stored in the write filter overlay.

7. The system of claim 1, wherein the one or more recurring files include at least one of:
    a plurality of log files;
    a plurality of browser cache files; and
    a plurality of application cache files.

8. A method for identifying write filter exclusions in a computing environment, the method comprising:
    monitoring, by an information handling system, a plurality of files to be stored in a write filter overlay of the information handling system;
    identifying one or more recurring files of the plurality of files, each of the one or more recurring files previously stored in the write filter overlay, and each of the one or more recurring files associated with a cumulative file size;
    determining if the cumulative file size associated with each of the one or more recurring files exceeds an adjustable threshold;
    in response to determining that a cumulative file size associated with a recurring file of the one or more recurring files exceeds the adjustable threshold, adding data describing the recurring file to an exclusion list;
    transmitting the exclusion list to a device management server for analysis;
    receiving a master exclusion list from the device management server based on the analysis, the master exclusion list including data describing a set of excluded files to be stored in a local storage resource of the information handling system;

redirecting the set of excluded files from being stored in the write filter overlay of the information handling system via an application programming interface; and storing the set of excluded files into the local storage resource of the information handling system.

9. The method of claim 8, wherein the analysis comprises:

receiving, by the device management server, a plurality of exclusion lists, each exclusion list including data describing one or more excluded files, and each exclusion list transmitted by an information handling system in the computing environment;

selecting, by the device management server, the set of excluded files from the plurality of exclusion lists;

generating, by the device management server, the master exclusion list; and transmitting, by the device management server, the master exclusion list to each information handling system in the computing environment.

10. The method of claim 9, wherein the set of excluded files comprises at least one of:

one or more excluded files included in a threshold percentage of the plurality of exclusion lists;

one or more excluded files having a highest frequency of being previously stored in the write filter overlay of each information handling system; and one or more excluded files having a highest cumulative file size.

11. The method of claim 8, further comprising:

identifying one or more large files of the plurality of files, each of the one or more large files associated with a file size that exceeds the adjustable threshold; and adding data describing the one or more large files to the exclusion list.

12. The method of claim 8, further comprising:

identifying one or more folders storing the one or more recurring files on the information handling system; and adding data describing the one or more folders to the exclusion list.

13. The method of claim 8, wherein the cumulative file size is comprised of a file size for each instance in which the recurring file was previously stored in the write filter overlay.

14. The method of claim 8, wherein the one or more recurring files include at least one of:

a plurality of log files;

a plurality of browser cache files; and a plurality of application cache files.

15. A method for identifying write filter exclusions for a plurality of information handling systems in a computing environment, the method comprising:

receiving, by a device management server, a plurality of exclusion lists, each exclusion list including data describing one or more excluded files, and each exclusion list transmitted by an information handling system in the computing environment;

selecting, by the device management server, a set of excluded files from the plurality of exclusion lists, the set of excluded files to be stored in a local storage resource in each of the plurality of information handling systems in the computing environment;

generating, by the device management server, a master exclusion list, wherein the master exclusion list includes the set of excluded files;

transmitting, by the device management server, the master exclusion list to each of the plurality of information handling systems in the computing environment;

receiving, by each of the plurality of information handling systems, the master exclusion list from the device management server;

redirecting, by each of the plurality of information handling systems, the set of excluded files from being stored in a write filter overlay in each of the plurality of information handling systems via an application programming interface; and storing, by each of the plurality of information handling systems, the set of excluded files into the local storage resource in each of the plurality of information handling systems.

16. The method of claim 15, wherein the data describing one or more excluded files includes at least one of:

a filename of the excluded file;

a cumulative file size associated with the excluded file; and a frequency in which the excluded file has been previously stored in a write filter overlay of the information handling system.

17. The method of claim 16, wherein the cumulative file size is comprised of a file size for each instance in which the excluded file was previously stored in the write filter overlay.

18. The method of claim 15, wherein the one or more excluded files include at least one of:

a plurality of log files;

a plurality of browser cache files; and a plurality of application cache files.

* * * * *